United States Patent
Fusco et al.

(10) Patent No.: US 10,766,333 B2
(45) Date of Patent: Sep. 8, 2020

(54) INTERCHANGEABLE OPERABLE DUCT WITH BLOCKING COMPONENT FOR A DRIVER-ONLY FUNCTION

(71) Applicant: Ford Global Technologies, LLC, Dearborn, MI (US)

(72) Inventors: Frank Fusco, Plymouth, MI (US); Jennifer A. Herr-Rathke, Plymouth, MI (US); Manfred Koberstein, Troy, MI (US); Jose A. Nava, Plymouth, MI (US); Steven M. Kahrs, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/605,490

(22) Filed: May 25, 2017

(65) Prior Publication Data
US 2018/0272832 A1     Sep. 27, 2018

Related U.S. Application Data

(60) Provisional application No. 62/475,464, filed on Mar. 23, 2017.

(51) Int. Cl.
*B60H 1/00* (2006.01)

(52) U.S. Cl.
CPC ..... *B60H 1/00021* (2013.01); *B60H 1/00671* (2013.01); *B60H 1/00692* (2013.01); *B60H 2001/00192* (2013.01)

(58) Field of Classification Search
CPC ............ B60H 1/00671; B60H 1/00692; B60H 1/00664; B60H 1/00021; B60H 1/24; B60H 2001/00221; B60H 1/34; B60H 1/3414; B60H 1/3421; B60H 1/3428; B60H 1/3435; B60H 1/3442
USPC ..................... 454/69, 75, 143–145, 152–155
See application file for complete search history.

(56) References Cited

U.S. PATENT DOCUMENTS

| | | | |
|---|---|---|---|
| 4,991,405 A | 2/1991 | Sakano | |
| 5,390,508 A | 2/1995 | Benedict | |
| 5,862,677 A * | 1/1999 | Kim | B60H 1/00064 165/42 |
| 5,934,988 A | 8/1999 | Fischer | |
| 7,794,314 B2 * | 9/2010 | Sekiya | B60H 1/00692 165/41 |
| 9,573,437 B2 | 2/2017 | Osaka et al. | |
| 2002/0072321 A1 * | 6/2002 | Kowalski | B60H 1/00742 454/155 |
| 2006/0063481 A1 | 3/2006 | Droulez et al. | |

(Continued)

FOREIGN PATENT DOCUMENTS

| | | | | |
|---|---|---|---|---|
| EP | 1920955 A1 * | 5/2008 | | B60H 1/242 |
| WO | 0138115 | 5/2001 | | |

*Primary Examiner* — Vivek K Shirsat
*Assistant Examiner* — Ko-Wei Lin
(74) *Attorney, Agent, or Firm* — David Coppiellie; Price Heneveld LLP

(57) ABSTRACT

A vehicle air-handling system includes a heat exchanger, a blower in communication with the heat exchanger, and an operable duct having driver and passenger portions that are each in communication with the heat exchanger and the blower. When the blower is activated, the driver portion continuously delivers blower air and the passenger portion selectively delivers blower air.

13 Claims, 15 Drawing Sheets

(56) References Cited

U.S. PATENT DOCUMENTS

| | | | |
|---|---|---|---|
| 2011/0114739 A1* | 5/2011 | Misumi | B60H 1/00742 236/49.3 |
| 2012/0015594 A1 | 1/2012 | Yenneti et al. | |
| 2014/0179213 A1* | 6/2014 | Moon | B60H 1/34 454/152 |

* cited by examiner

INTERCHANGEABLE OPERABLE DUCT WITH BLOCKING COMPONENT FOR A DRIVER-ONLY FUNCTION

CROSS-REFERENCE TO RELATED APPLICATION

This application claims priority to and the benefit under 35 U.S.C. § 119(e) of U.S. Provisional Patent Application No. 62/475,464, filed on Mar. 23, 2017, entitled "INTERCHANGEABLE OPERABLE DUCT WITH BLOCKING COMPONENT FOR A DRIVER-ONLY FUNCTION," the entire disclosure of which is hereby incorporated herein by reference.

FIELD OF THE INVENTION

The present invention generally relates to air-handling systems within vehicles, and more specifically, an air-handling system for a vehicle incorporating an operable duct that can be closed off to provide blower air only to a driver section of the passenger cabin.

BACKGROUND OF THE INVENTION

Vehicles include air-handling systems that provide heating and cooling to various portions of the passenger cabin of the vehicle. These air-handling systems can be activated and deactivated as needed for serving the driver and the occupants during use. Certain portions of a passenger cabin may have dedicated air-handling systems with separate heating and cooling functions as well as individual blowers for moving air throughout portions of the cabin.

SUMMARY OF THE INVENTION

According to one aspect of the present invention, a vehicle air-handling system includes a heat exchanger, a blower in communication with the heat exchanger, and an operable duct having driver and passenger portions that are each in communication with the heat exchanger and the blower. When the blower is activated, the driver portion continuously delivers blower air and the passenger portion selectively delivers blower air.

Embodiments of this aspect of the invention can include any one or combination of the following features:
   the passenger portion is operable between an open position where the heat exchanger and the blower are in communication with a passenger section of a passenger cabin of a vehicle and a closed position wherein the heat exchanger and the blower are only in communication with a driver section of the passenger cabin
   the vehicle is an electric vehicle
   the operable duct includes a console duct that delivers blower air to a console of the vehicle
   the operable duct includes a panel duct that delivers blower air to a dashboard of the vehicle
   the operable duct includes a floor duct that delivers air to an area proximate a floor of the vehicle
   each of the console, panel and floor ducts includes a driver portion and a passenger portion
   the closed position of the passenger portion defines a rest state of the passenger portion
   the passenger portion of the operable duct moves to the open position in response to a passenger occupying the passenger section of the passenger cabin
   the passenger portion of the operable duct includes an operable panel that operates to selectively define the open and closed positions
   the operable panel is a slidably operable blocking member
   the operable panel is a rotationally operable panel
   the heat exchanger and the blower define a common blowing assembly that serves each of the driver and passenger portions of the operable duct According to another aspect of the present invention, an air-handling system for a vehicle includes a heat exchanger disposed within a housing, a blower in communication with the heat exchanger and an operable duct positioned external to the housing and in communication with each of the heat exchanger and the blower. The operable duct includes a driver portion that serves a driver section of a passenger cabin each time the blower is activated and a passenger portion that selectively serves a passenger section of the passenger cabin when the blower is activated. The passenger portion is operable between an open position where the heat exchanger and the blower are in communication with the passenger section and a closed position wherein the heat exchanger and the blower are only in communication with the driver section.

Embodiments of this aspect of the invention can include any one or combination of the following features:
   the operable duct is an intermediate duct
   the operable duct is a floor duct
   the operable duct is a panel duct According to another aspect of the present invention, A method of installing an air-handling system into a vehicle includes disposing an air conduit proximate a housing of an air-handling assembly to define a duct receptacle, selecting one of a static and an operable duct as a selected duct and coupling the selected duct with the duct receptacle. The operable duct includes driver and passenger portions that are each in communication with a blower. When the operable duct is the selected duct, activation of the blower results in the driver portion continuously delivering blower air and the passenger portion selectively delivering blower air.

Embodiments of this aspect of the invention can include any one or combination of the following features:
   the blower and a heat exchanger are disposed proximate the housing and upstream of the duct receptacle
   when the operable duct is the selected duct, the passenger portion of the operable duct is operable between open and closed positions
   the open position of the passenger portion is defined by the heat exchanger and the blower in communication with a passenger section of a passenger cabin
   the closed position of the passenger portion is defined by the heat exchanger and the blower only in communication with a driver section of the passenger cabin
   the operable duct includes a console duct that delivers blower air to a console of the vehicle
   the operable duct includes a panel duct that delivers blower air to a dashboard of the vehicle
   the operable duct includes a floor duct that delivers air to an area proximate a floor of the vehicle
   the heat exchanger and the blower define a common blowing assembly that serves each of the driver and passenger portions of the operable duct These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
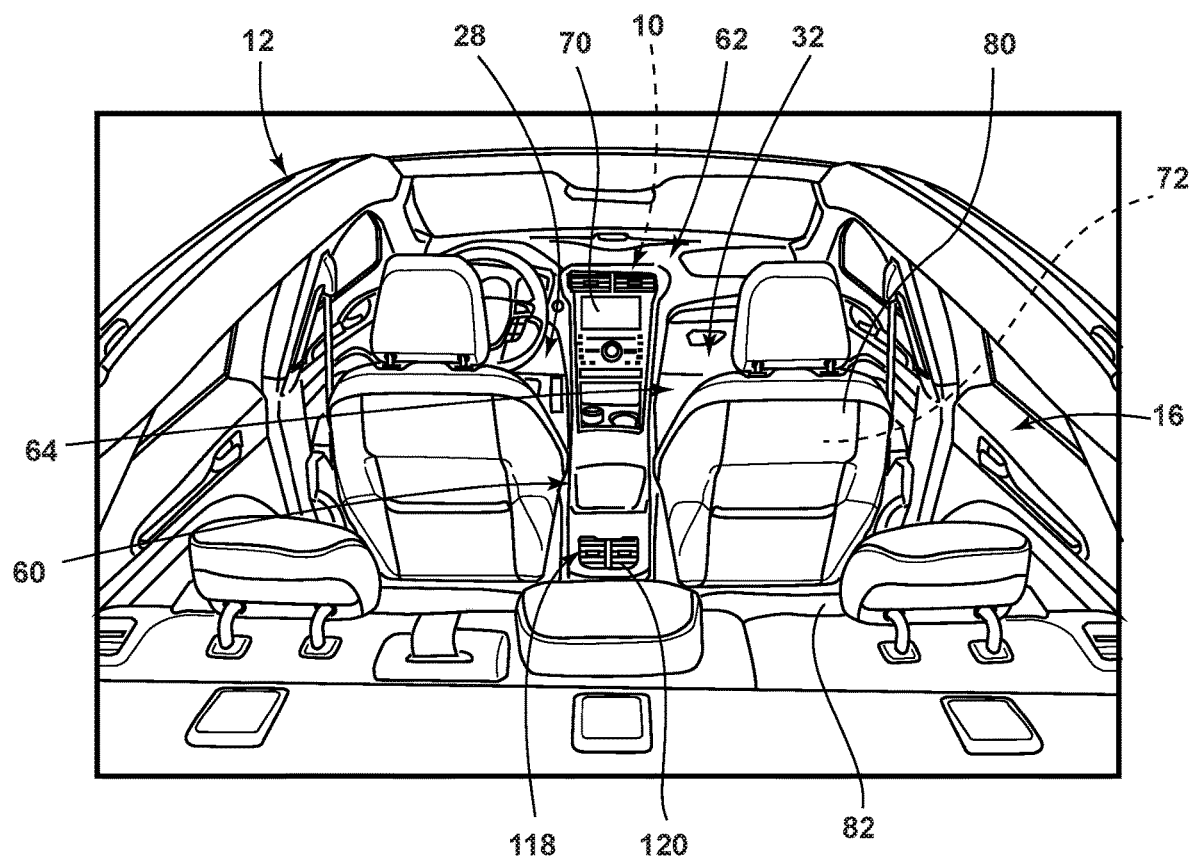
FIG. 1 is a rear perspective view of a passenger cabin of a vehicle.
Figure 2:
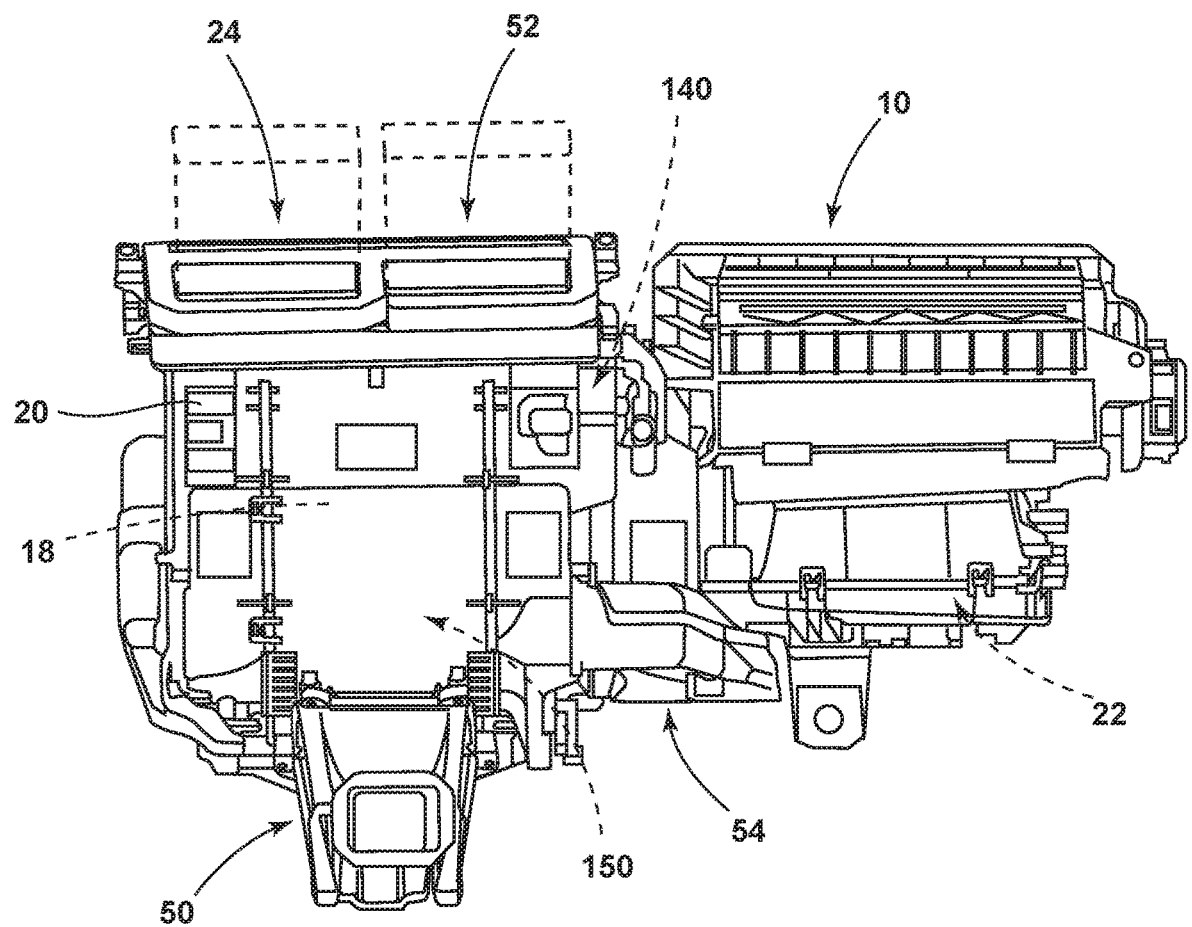
FIG. 2 is a perspective view of an air-handling system of a vehicle showing the housing and the various aspects of operable ducts attached thereto.
Figure 3:
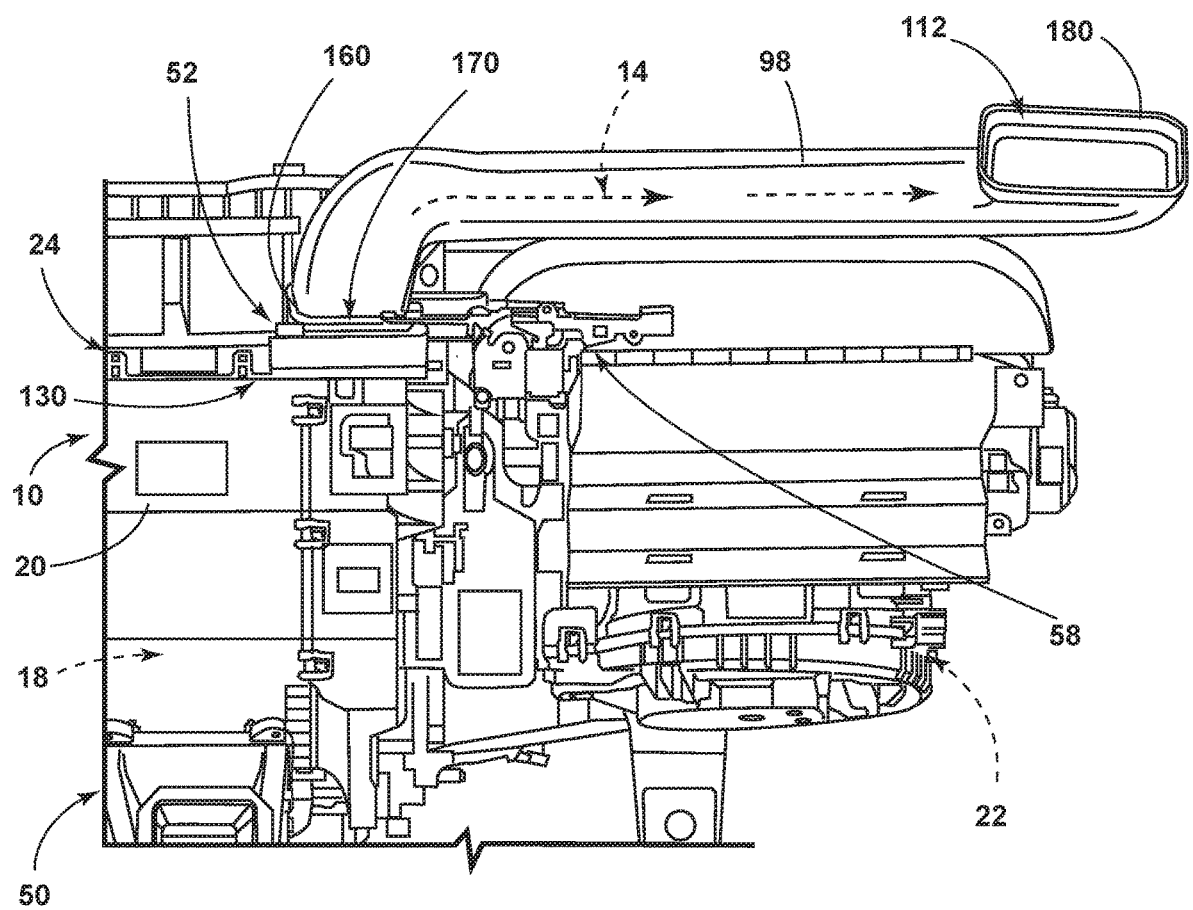
FIG. 3 is a perspective view of the air-handling system of FIG. 2 incorporating an aspect of the operable duct coupled between the housing and an air conduit for serving a portion of the passenger cabin of the vehicle.
Figure 4:
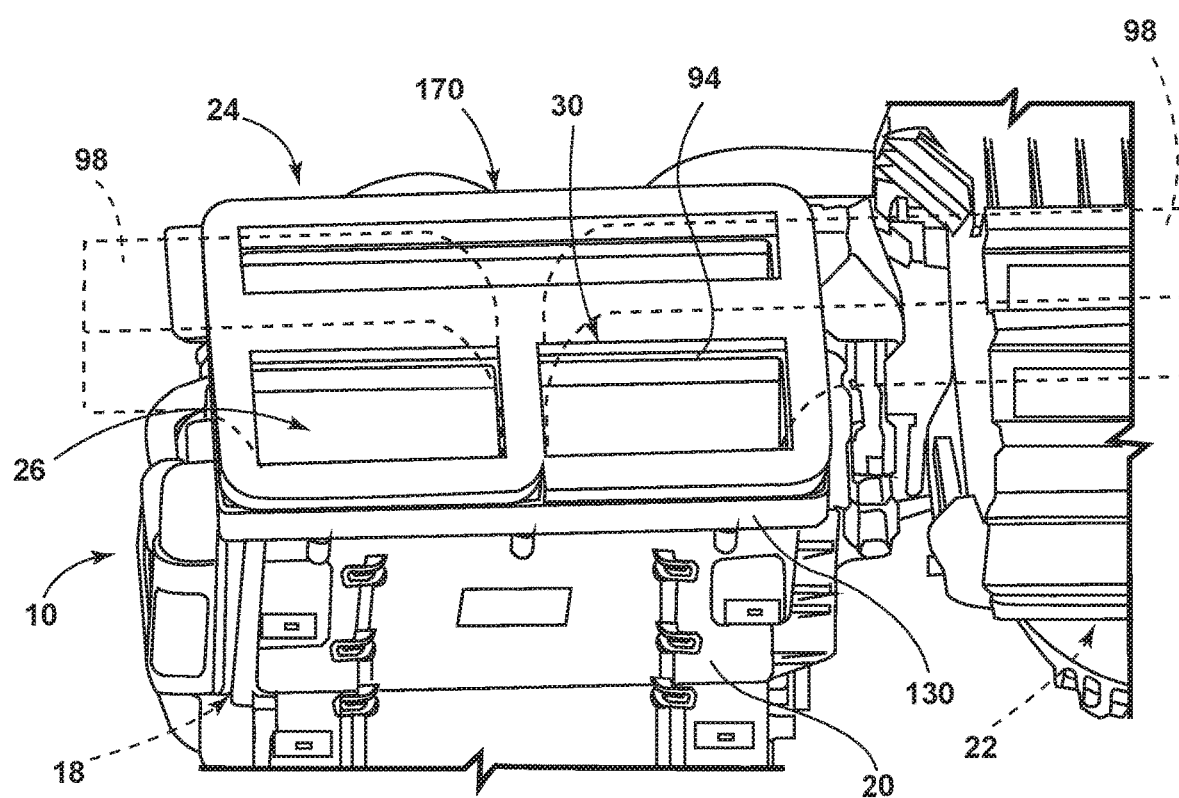
FIG. 4 is an enlarged perspective view of an aspect of the operable ducts illustrated with the blocking member removed.
Figure 5:
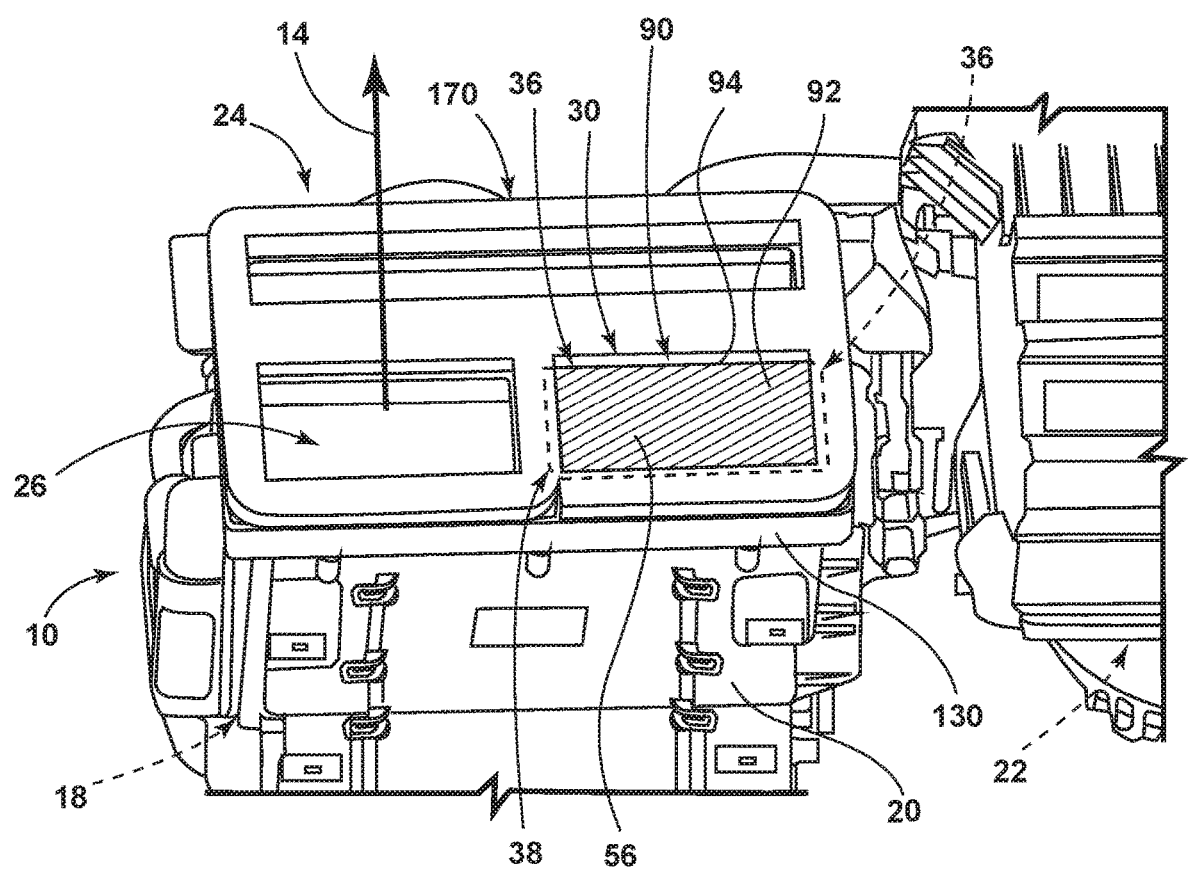
FIG. 5 is a top perspective view of the operable duct of FIG. 4 showing a slidable panel in a closed position.
Figure 6:
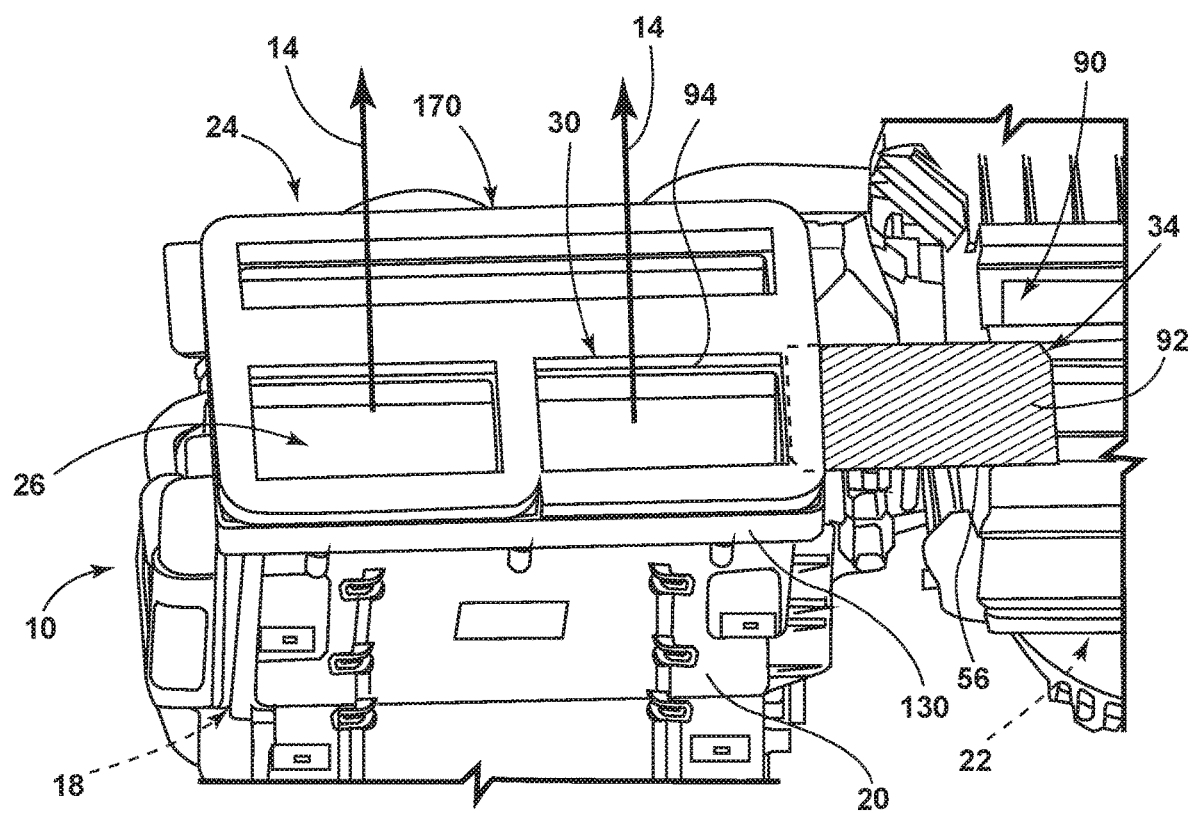
FIG. 6 is a top perspective view of the operable duct of FIG. 4 showing a slidable panel in an open position.
Figure 7:
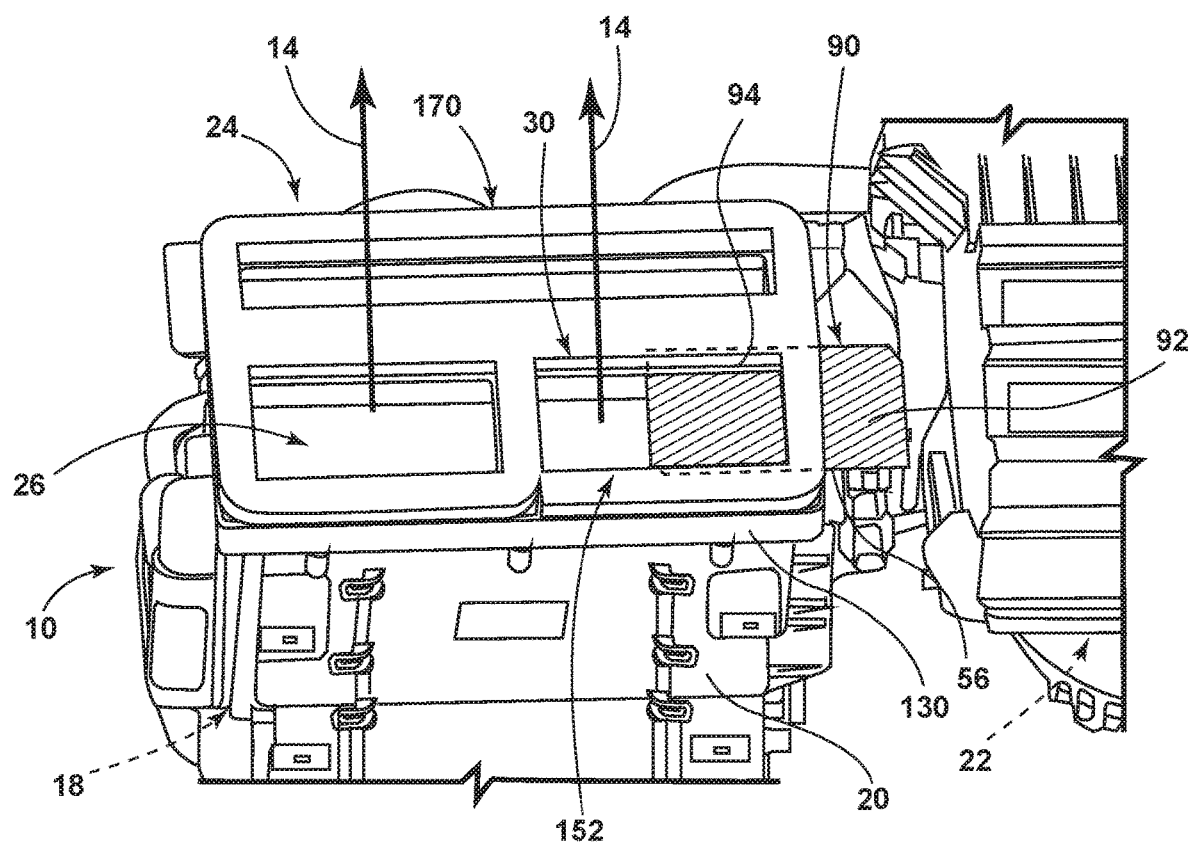
FIG. 7 is a top perspective view of the operable duct of FIG. 4 showing a slidable panel in a partially-closed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-11, reference numeral 10 generally refers to an air-handling system for a vehicle 12, where the air-handling system 10 is adapted to deliver heated and cooled blower air 14 throughout various sections of the passenger cabin 16 for the vehicle 12. According to various aspects of the device, the air-handling system 10 for the vehicle 12 can include a heat exchanger 18 that is disposed within a housing 20. A blower 22 is positioned proximate the housing 20, typically within a portion of the housing 20, and is placed in communication with the heat exchanger 18. An operable duct 24 is positioned external to the housing 20 and in communication with each of the heat exchanger 18 and the blower 22. Typically, the heat exchanger 18 and the blower 22 define a common blowing assembly that is positioned upstream of the operable duct 24. According to the various aspects of the device, the operable duct 24 can include a driver portion 26 that serves a driver section 28 of the passenger cabin 16 each time the blower 22 is activated. The operable duct 24 can also include a passenger portion 30 that selectively serves a passenger section 32 of the passenger cabin 16 when the blower 22 is activated. To achieve the selective operation of the passenger portion 30 of the operable duct 24, the passenger portion 30 is operable between open and closed positions 34, 36. In the open position 34, the heat exchanger 18 and blower 22 are in communication with the driver section 28 and the passenger section 32 of the passenger cabin 16. The closed position 36 of the passenger portion 30 is defined by the heat exchanger 18 and the blower 22 being in communication with (i.e., deliver blower air 14 to) only the driver section 28 of the passenger cabin 16. In this manner, a single heat exchanger 18 and a single blower 22 are adapted to deliver blower air 14 in a selected manner through the operable duct 24. Accordingly, when the operable duct 24 is in the open position 34, a common heat exchanger 18 and common blower 22 combination can be adapted to serve both the driver section 28 and passenger section 32 of the passenger cabin 16. Conversely, when the operable duct 24 is in a closed position 36, the common heat exchanger 18 and blower 22 serve only the driver section 28 of the passenger cabin 16. In this manner, the operable duct 24 can define a driver-only mode 38.

Referring again to FIGS. 1-11, the operable duct 24 can include multiple ducts that are coupled to the housing 20 for delivering blower air 14 proximate the front seating positions of the vehicle 12. These operable ducts 24 can include a console duct 50, or intermediate duct, that delivers blower air 14 to a console 60. The operable duct 24 can also include a panel duct 52 that delivers blower air 14 to a dashboard 62 of the vehicle 12, as well a floor duct 54 that delivers blower air 14 to an area proximate the floor 64 of the vehicle 12. Each of these operable ducts 24 includes a driver portion 26 and a passenger portion 30. Additionally, each of these operable ducts 24 includes a blocking member 56 that is operable with respect to the passenger portion 30 to define the open and closed positions 34, 36 of the passenger portion 30 of each operable duct 24.

In various embodiments as exemplified in FIGS. 1-11, when each of the operable ducts 24 are in a rest state, the blocking member 56 of the operable duct 24 can be defined by the closed position 36. In this manner, an actuator 58 is adapted to operate the blocking member 56 to the open position 34 in order to allow for blower air 14 to be delivered through the passenger portion 30 and to the passenger section 32 of the vehicle 12. The actuator 58 can also be a two-way actuator 58 that selectively operates the blocking member 56 between the open and closed positions 34, 36 and various positions in-between.

According to various aspects of the device, it is contemplated that the blocking member 56 of the passenger portion 30 for the operable duct 24 can be manipulated to the open position 34 in response to movement of an actuator 58 coupled to the operable duct 24. The actuator 58 can be activated in response to a specific command from a user interface 70 disposed within the vehicle 12. Alternatively, the actuator 58 can be activated passively such that the actuator 58 is activated to move the blocking member 56 to the open position 34 when various sensors 72 indicate that a passenger is located in or otherwise occupying one of the passenger sections 32 of the passenger cabin 16 and that blower air 14 is desired in the passenger section 32.

The passenger section 32 of the passenger cabin 16 typically includes the front passenger seat 80. It is contemplated that the passenger section 32 can also include any rear seating positions 82 included within the passenger cabin 16. Additionally, where a passive activation mechanism is included, occupants within the passenger section 32 of the passenger cabin 16 can selectively deactivate the operable duct 24 to move the blocking member 56 to the closed position 36, or a partially-closed position 152. In such an embodiment, occupants can allow for the movement of blower air 14 only, or primarily, to the driver section 28, as well as, when desired, other portions of the passenger section 32 of the vehicle 12. The passive actuation system can be initiated through various sensors 72 within the passenger cabin 16. Such sensors 72 can include, but are not limited to, weight sensors, movement sensors, heat sensors, combinations thereof and other arrangements of sensors 72 that can be used to identify the presence of an individual within one or more portions of the passenger section 32 of the vehicle 12.

Referring again to FIGS. 1-11, each operable duct 24 includes the driver portion 26 and the passenger portion 30. Upon activation of the blower 22 for the air-handling system 10, blower air 14 is continuously delivered through the driver portion 26 of the operable duct 24. Conversely, the blocking member 56, typically in the form of an operable panel 90, can be manipulated between the open and closed positions 34, 36 for selectively delivering blower air 14 to the passenger section 32 of the passenger cabin 16.

As exemplified in FIGS. 5-9, the operable panel 90 can be in the form of a slidable panel 92 that can be linearly operated relative to the passenger portion 30 of the operable duct 24, to define the open, closed and partially-closed positions 34, 36, 152. In various aspects of the device, the operable duct 24 can include an operating slot 94 through which the operable panel 90 can operate to define the open, closed and partially-closed positions 34, 36, 152.

Figure 10:
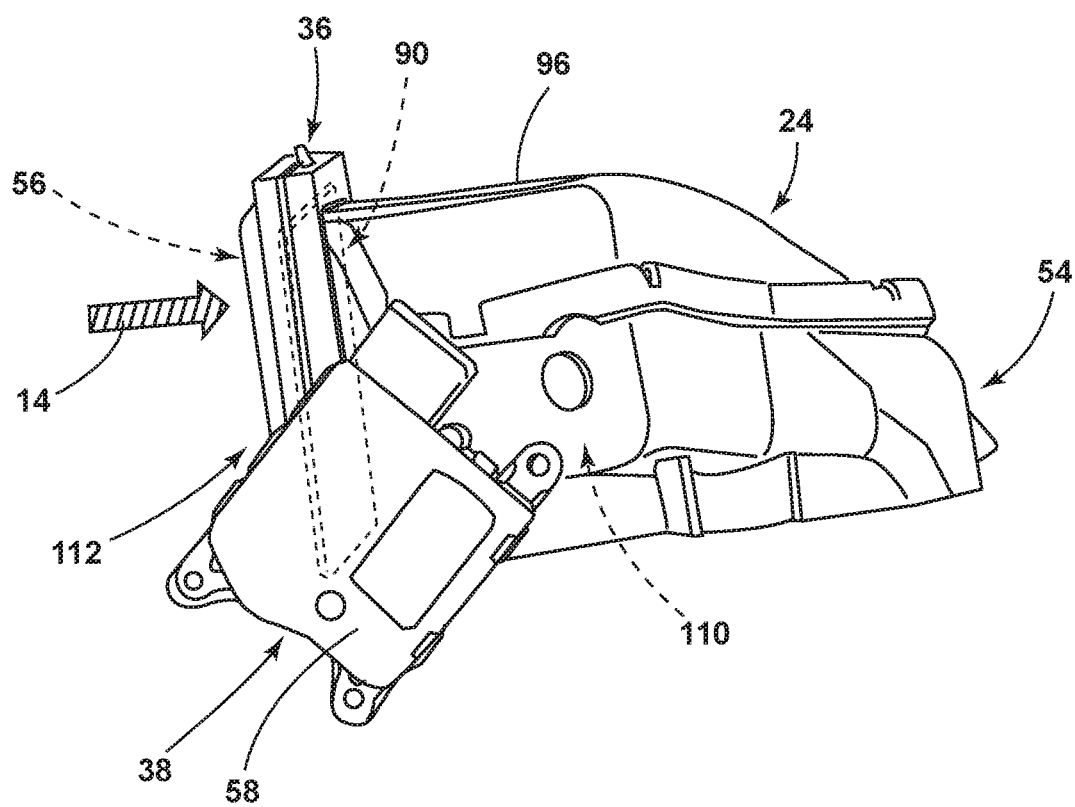
FIG. 10 is a side perspective view of an aspect of the operable duct showing a rotational blocking member in a closed position.
Figure 11:
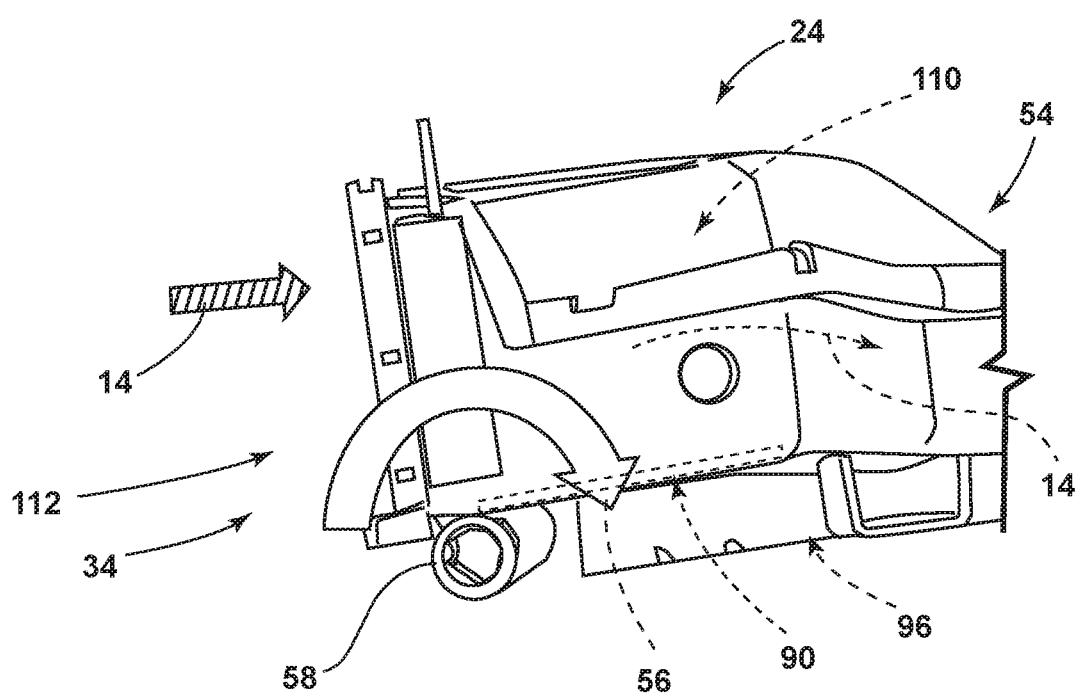
FIG. 11 is a side perspective view of the operable duct of FIG. 10 showing the blocking member in an open position.

Referring now to FIGS. 10 and 11, the operable panel 90 can also be a rotationally operable panel 96 that is disposed within the operable duct 24. Where the operable panel 90 is a rotationally operable blocking member 56, it is contemplated that the blocking member 56 will be continually located inside of the passenger portion 30 of the operable duct 24 or enclosed within the operable duct 24, housing 20 and/or an air conduit 98. Space 110 within the operable duct 24 is provided for manipulation of the blocking member 56 therein to define the open, closed, and partially-closed positions 34, 36, 152.

In the case of a slidably operable blocking member 56, as exemplified in FIGS. 5-9, it is contemplated that the actuator 58 may be located outside of the passenger portion 30 of the operable duct 24. This actuator 58 can linearly operate the blocking member 56 between the closed position 36, where the blocking member 56 is within and covering the passenger portion 30, to the open position 34, where the blocking member 56 is moved away from the passenger portion 30 and at least partially outside of the air path 112 for the operable duct 24. In such an embodiment, the actuator 58 is typically located outside of the operable duct 24 as exemplified in FIG. 3. The slidable panel 92 and the rotationally operable panel 96 can be used in any of the operable ducts 24. Typically, the console duct 50 and floor duct 54 may include the rotationally operable panel 96 and the panel duct 52 may include the slidable panel 92. According to various aspects of the device, the operable panel 90 can be activated through a solenoid, stepper motor, servo motor, combinations thereof and other similar operating assemblies.

Figure 8:
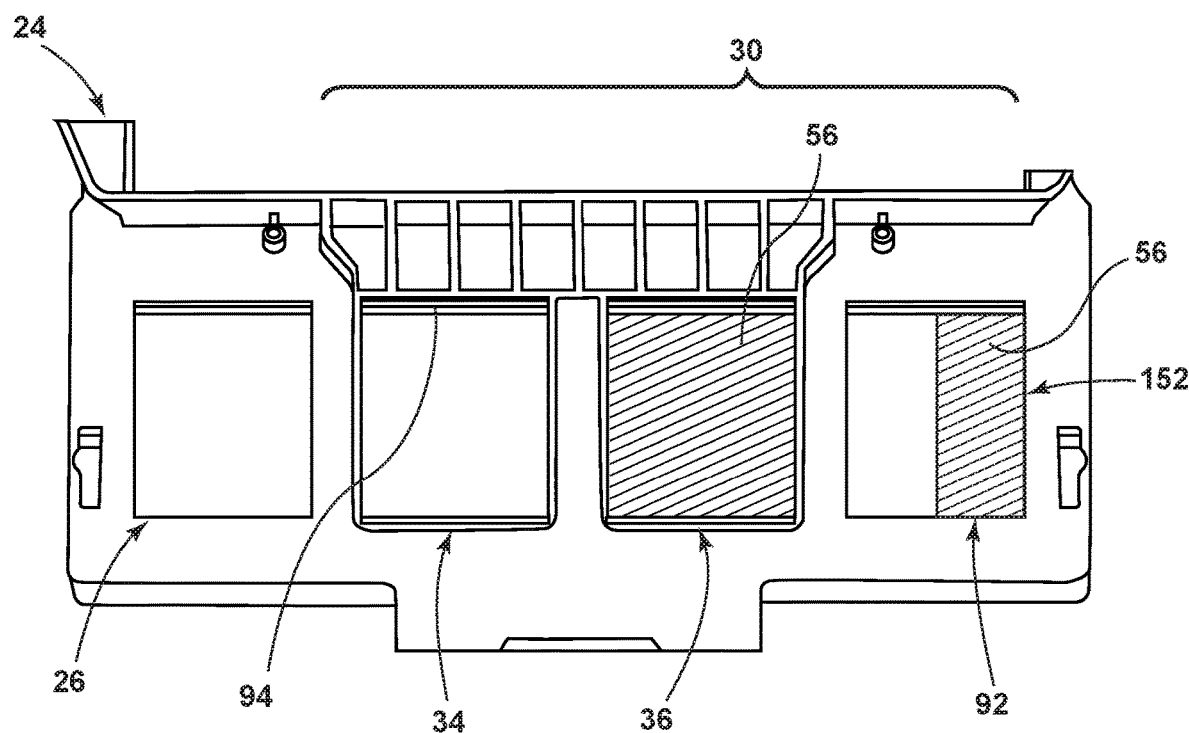
FIG. 8 is a perspective view of an aspect of the operable duct showing separate and dedicated passenger portions.
Figure 9:
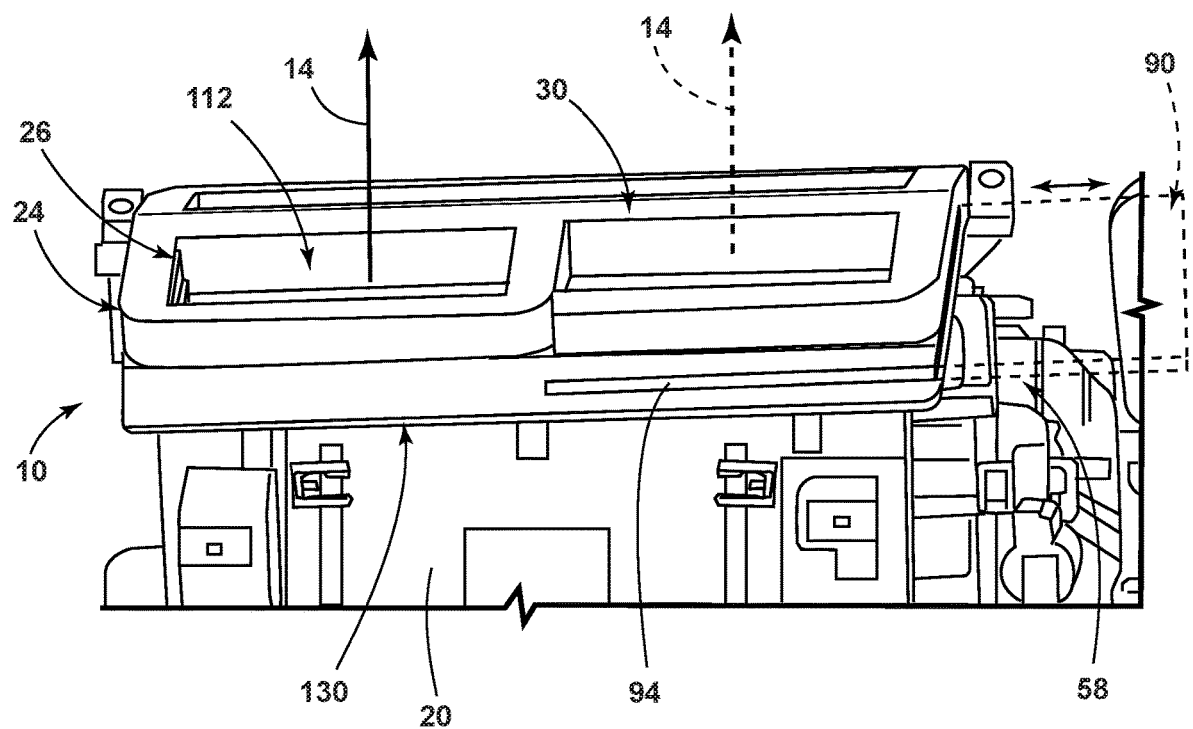
FIG. 9 is a side perspective view of an aspect of the operable duct showing a slot for receiving the blocking member.

Referring now to FIG. 8, it is contemplated that the operable duct 24 can include a single driver portion 26 and multiple passenger portions 30 that are each selectively operable between open, closed and partially-closed positions 34, 36, 152. The various passenger portions 30 of the operable duct 24 can be adapted to serve separate passenger sections 32 within the passenger cabin 16. By way of example, and not limitation, the various passenger portions 30 of the operable duct 24 can be configured to serve the front passenger seat 80, and left and right rear seating positions 82, respectively. Each of these passenger portions 30 of the operable duct 24 can be operated to define open, closed and partially-closed positions 34, 36, 152 of the operable duct 24 such that blower air 14 may be directed only to where it is necessary, or desired, within the vehicle 12, such as only where passengers are located within the passenger cabin 16.

Figure 12:
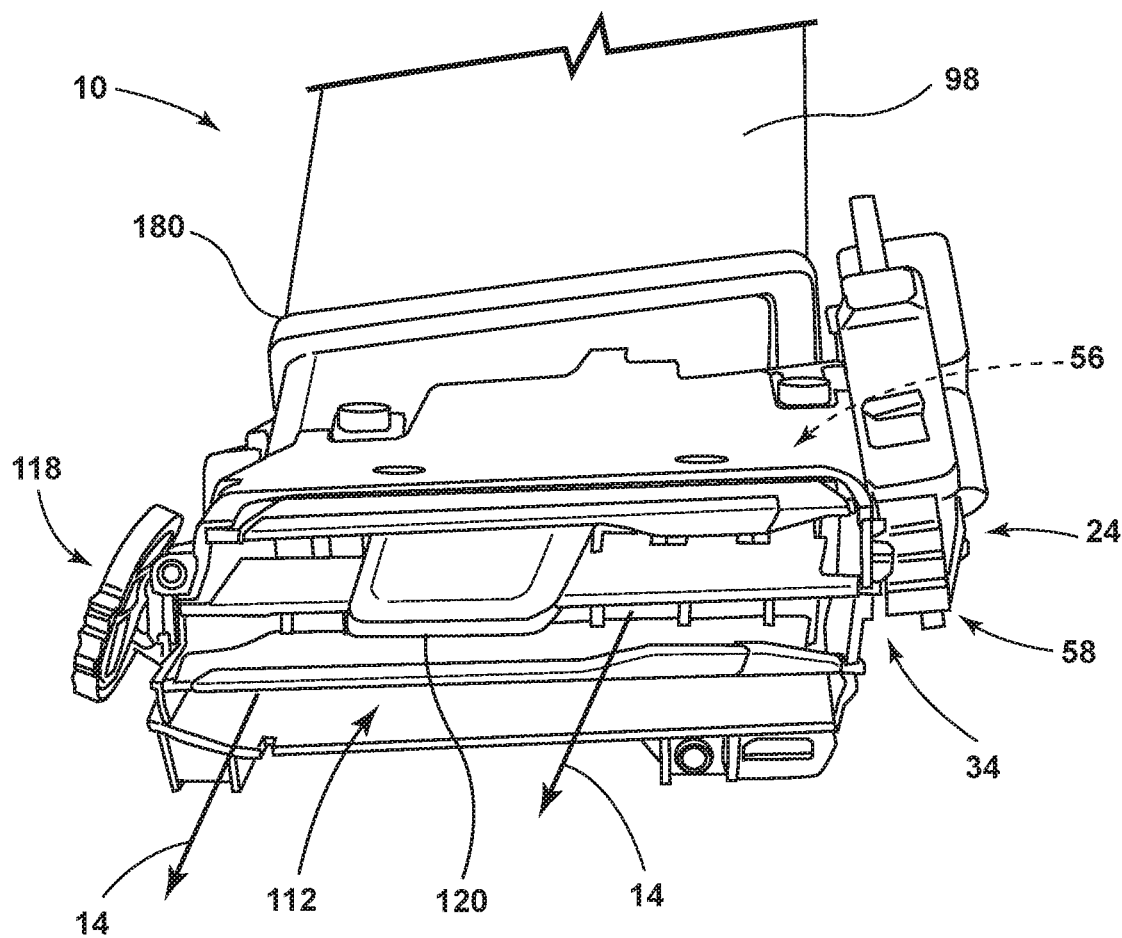
FIG. 12 is an alternative aspect of the operable duct shown disposed proximate an outer register of the air-handling system.

Referring now to FIG. 12, it is contemplated that the operable duct 24 can be located distal from the housing 20 and can be located proximate a register shut-off door 120 for the air-handling system 10. Accordingly, the operable duct 24 can be activated and deactivated at the register 118 for a specific air conduit 98 for stopping the flow of blower air 14 to a certain passenger section 32 of the passenger cabin 16. In various aspects of the device, a series of operable ducts 24 can be used throughout the vehicle 12. Certain operable ducts 24 may be located at the housing 20 of the air-handling system 10. These operable ducts 24 of the housing 20 may serve to generally direct the blower air 14 to various portions of the passenger section 32. Additional operable ducts 24 may be located at the registers 118 within the passenger section 32. These operable ducts 24 of the registers 118 can be used to fine tune the output of blower air 14 within the various portions of the passenger section 32.

Figure 13:
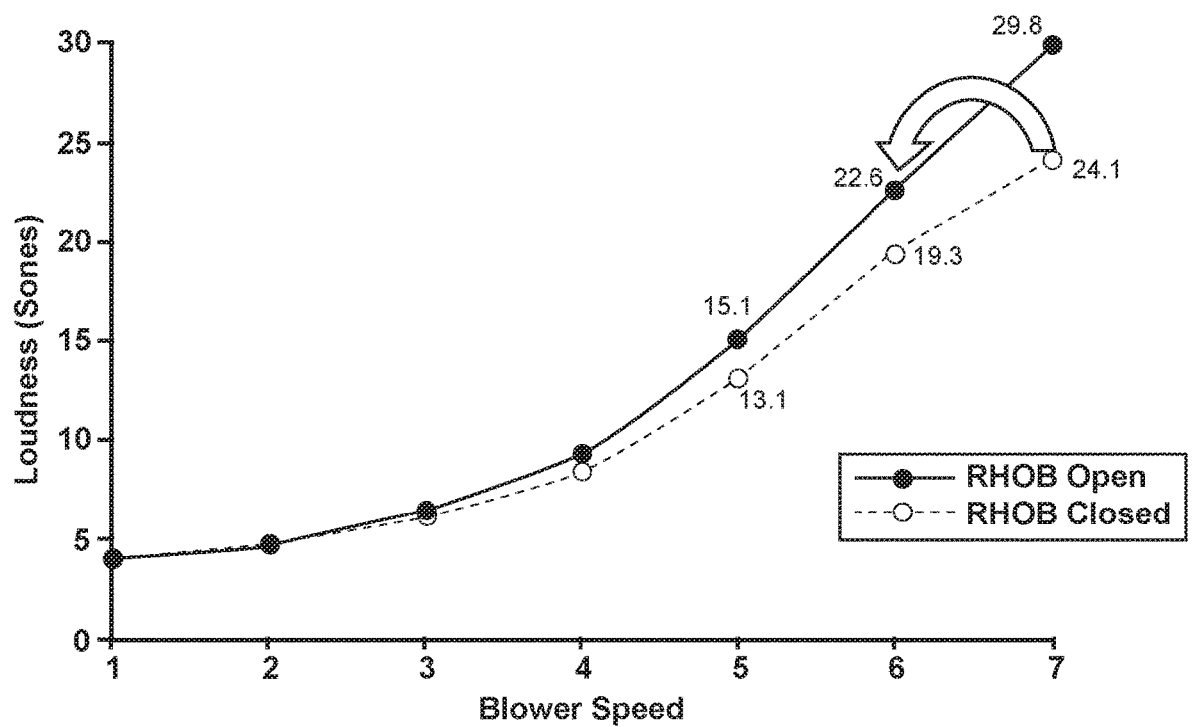
FIG. 13 is a schematic diagram illustrating sound performance of the operable duct in the open and closed positions.
Figure 14:
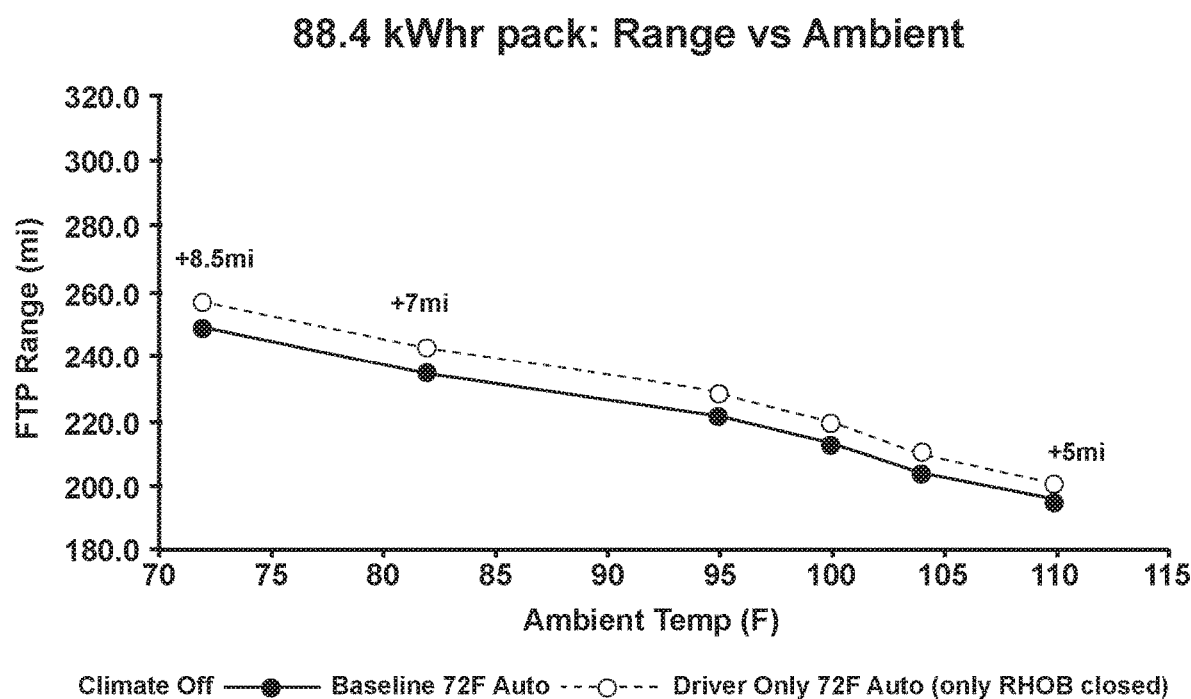
FIG. 14 is a schematic diagram illustrating a performance graph showing an exemplary operational range of an electrical vehicle when using the standard duct versus an aspect of the operable duct in a driver-only mode.
Figure 15:
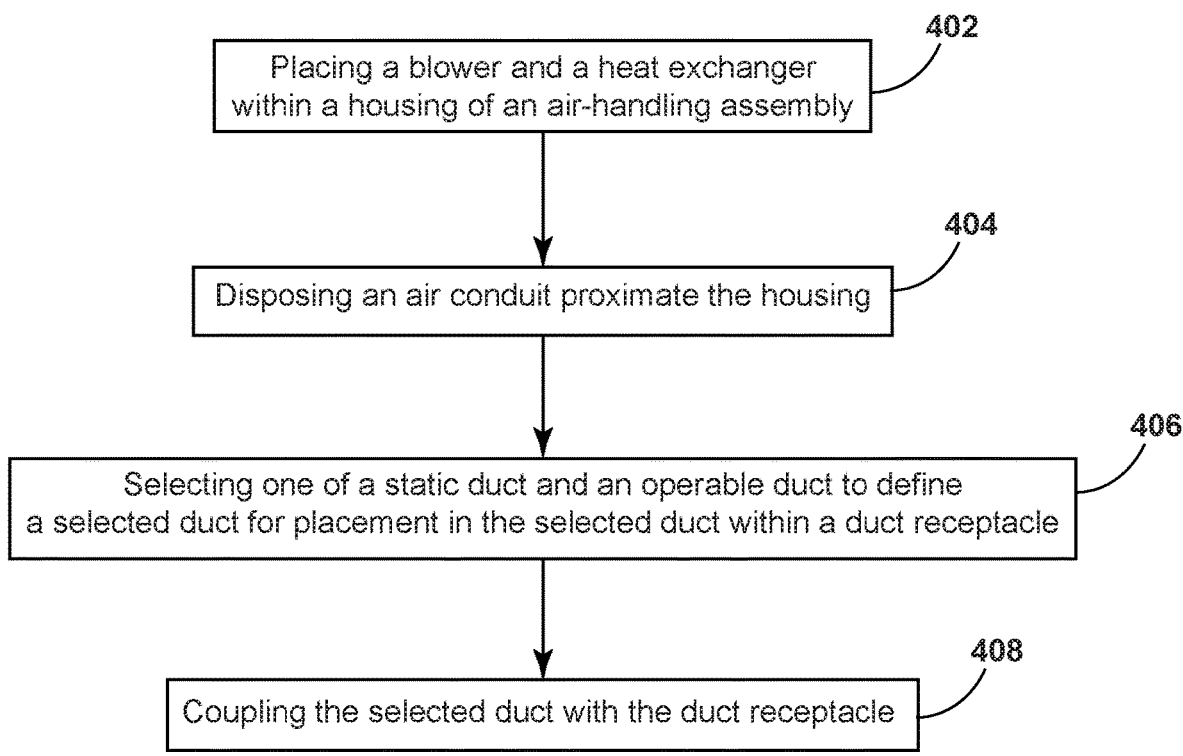
FIG. 15 is a schematic flow diagram illustrating a method for installing an air-handling system into a vehicle.

Referring now to FIGS. 13 and 14, the use of the operable duct 24 is shown to produce positive results, in particular, where the operable duct 24 is disposed within an electrical vehicle 12, such as a hybrid-type vehicle 12, where both a combustion engine and electric motor are used in cooperation, as well as in a fully electric vehicle 12 that is free of a combustion engine. From a comfort standpoint, noise associated with a blower 22 can be decreased when the operable duct 24 is in the closed position 36. Because a common evaporator, or similar heat exchanger 18, and blower 22 are used in relation to the driver and passenger portions 26, 30 of the operable duct 24, the amount of noise is also decreased through closure of a portion of the operable duct 24.

Additionally, as exemplified in FIG. 14, the closure of the passenger portion 30 of the operable duct 24 in relation to a conventional duct system can increase the range of a fully electric vehicle 12 by approximately seven miles or more. Because the operable duct 24 uses a common heat exchanger 18 and blower 22, less energy may be used to provide the air necessary to the driver in a driver-only mode 38, rather than providing air throughout the vehicle 12 at all times. When the passenger portion 30 of the operable duct 24 is closed, this can define the driver-only mode 38 of the air-handling system 10. In the driver-only mode 38, air is only provided to the driver section 28 of the passenger cabin 16. It is contemplated that various temperature and humidity sensors 72 within the passenger cabin 16 can ensure that only the driver section 28 of the passenger cabin 16 receives air in this condition during operation of the vehicle 12.

According to various aspects of the device, as exemplified in FIGS. 1-12, it is contemplated that the operable duct 24 can be used within conventional air-handling systems 10 as a replacement for a conventional duct. In such an embodiment, a duct receptacle 130 can be defined between the housing 20 and at least one air conduit 98. Within this duct receptacle 130, a conventional duct or, alternatively, an aspect of the operable duct 24, can be installed therein, where desired. This can be done at the time of manufacture, or, potentially, after market. In an after market situation, various actuators 58 and operating hardware and software may also be included, such that the operable duct 24 can be manipulated as needed to define the open, closed and partially-closed positions 34, 36, 152 of the passenger portion 30 of the operable duct 24.

As discussed above, the operable duct 24 can be used in conjunction with a conventional air-handling system 10 of a vehicle 12. By adding the operable duct 24 to this conventional air-handling system 10, the operable duct 24 can utilize a common heat exchanger 18 and common blower 22, without adding additional heat exchangers 18 and blowers 22 for stopping and/or modifying air flow to different passenger sections 32 of the passenger cabin 16. Where the operable duct 24 is coupled to the housing 20 to define one or more of the console duct 50, the floor duct 54 and the panel duct 52, each can include an operable blocking member 56 that can shut off the passenger portion 30 of each operable duct 24. Additionally, each of the console, floor and panel ducts 50, 54, 52 can include a total shut-off 140, where the blower air 14 can be shifted between individual ducts or a combination of ducts as desired by the user (e.g., defrost and floor setting, panel and defrost setting, panel and floor setting). The air-handling system 10 can also include an inboard duct 150 within the housing 20 to maintain airflow balance between these three operable ducts 24. In this manner, the blocking members 56 can be moved to a partially-closed position 152 to assist in balancing the flow of blower air 14 through the passenger cabin 16 without fully closing the various operable ducts 24.

Referring now to FIGS. 1-15, having described various aspects of the device, a method 400 is disclosed for installing an air-handling system 10 into a vehicle 12. According to the method 400, a blower 22 and heat exchanger 18 are placed within the housing 20 of an air-handling system 10 (step 402). An air conduit 98 is disposed proximate the housing 20 (step 404). In this manner, a duct receptacle 130 is defined between the housing 20 and an end 160 of the air conduit 98. One of a static duct (conventional duct) and an operable duct 24 are selected (step 406). In this manner, the selected duct 170 is identified between the static duct and the operable duct 24 for installation in the duct receptacle 130. The selected duct 170 is then coupled with the duct receptacle 130 (step 408). Where the selected duct 170 is an operable duct 24, the operable duct 24 includes driver and passenger portions 30 that are each in communication with the heat exchanger 18 and the blower 22. When the operable duct 24 is the selected duct 170 and is coupled with the duct receptacle 130, activation of the blower 22 results in the driver portion 26 continuously delivering the blower air 14 to the driver section 28 of the passenger cabin 16. Also, activation of the blower 22 results in the passenger portion 30 of the operable duct 24 selectively delivering blower air 14 to the passenger section 32 or sections of the passenger cabin 16.

Through the use of the operable duct 24, a driver-only mode 38 is usable within a vehicle 12 having a conventional air-handling assembly. Through use of the driver-only mode 38, blower air 14 is delivered only to the driver section 28 of the passenger cabin 16 to reduce power consumption within the vehicle 12. Savings of electricity used within the vehicle 12 is a concern in hybrid vehicles and electric vehicles. Use of the operable duct 24 serves to conserve the use of electricity by only providing blower air 14 to the driver section 28 in a driver-only mode 38.

According to various aspects of the device, the heat exchanger 18 and blower 22 are each included within the housing 20. In this manner, the blower 22 can move blower air 14 from the heat exchanger 18 through the operable duct 24 or through multiple operable ducts 24. The operable duct 24 can then be manipulated between the open and closed positions 34, 36 to dictate where the blower air 14 is directed within the passenger cabin 16. It is also contemplated that the operable duct 24 can be located at the register 118 toward the outlet 180 of the air conduit 98 to restrict the flow of blower air 14 within the air conduit 98 before it reaches the passenger cabin 16.

Through the use of the operable duct 24, the flow of blower air 14 through the passenger cabin 16 can be conducted efficiently while in the driver-only mode 38 as well as during operation of the vehicle 12 when one or more occupants are within the passenger section 32 of the vehicle 12. The result can include a reduced power dedicated to the blower 22, a reduced amount of cooling that is delivered by the heat exchanger 18 as well as a reduced compressor load for operating the heat exchanger 18. These reduced amounts of energy can lead to an increased range for electric vehicles, increased fuel efficiency for hybrid and combustion-type vehicles, as well as reduced climate air rush noise NVH (noise, vibration and harshness).

It is contemplated that the operable duct 24 can be included within any one of various vehicles 12 that can include, but are not limited to, electric vehicles, hybrid vehicles, combustion engine vehicles, SUVs, vans, sedans, coupes, fleet vehicles and other similar vehicles 12. Additionally, the operable duct 24 can be included to serve a driver's section 28 of the passenger cabin 16 as well as one or more passenger sections 32 of the passenger cabin 16. Accordingly, a single heat exchanger 18 and single blower 22 can be used to serve the entire passenger cabin 16 of the vehicle 12, where the blower air 14 is apportioned throughout the passenger cabin 16 by operation of the blocking member 56 of the operable duct 24 between the open, partially-closed and closed positions 34, 152, 36.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle air-handling system comprising:
a heat exchanger disposed within a housing;
a blower in communication with the heat exchanger and the housing;
an operable duct attached to an outer surface of the housing, wherein the operable duct includes separate driver and passenger portions that are each in communication with the heat exchanger and the blower; and a planar blocking member that slidably operates within the operable duct to define open and closed positions of the passenger portion, the open position defined by the planar blocking member being positioned entirely outside of the driver and passenger portions; wherein when the blower is activated, the planar blocking member operates such that the driver portion of the operable duct continuously delivers blower air to a driver-side air conduit and the passenger portion of the operable duct selectively delivers blower air, to a passenger-side air conduit; and the operable duct is an adapter that is positioned between the housing and the driver-side and passenger-side air conduits and attaches the driver-side and passenger-side air conduits to the housing.

2. The vehicle air-handling system of claim 1, wherein the passenger portion of the operable duct is operable between the open position where the heat exchanger and the blower are in communication with a passenger section of a passenger cabin of a vehicle and the closed position wherein the heat exchanger and the blower are only in communication with a driver section of the passenger cabin.

3. The vehicle air-handling system of claim 2, wherein the heat exchanger, the blower and the operable duct are disposed within an electric vehicle.

4. The vehicle air-handling system of claim 1, wherein the operable duct includes a console duct that delivers blower air to a vehicle console, a panel duct that delivers blower air to a vehicle dashboard and a floor duct that delivers air to an area proximate a vehicle floor.

5. The vehicle air-handling system of claim 4, wherein each of the console, panel and floor ducts includes a driver portion and a passenger portion.

6. The vehicle air-handling system of claim 2, wherein the planar blocking member of the operable duct moves to the open position in response to a passenger occupying the passenger section of the passenger cabin.

7. The vehicle air-handling system of claim 2, wherein the planar blocking member is linearly operable within the operable duct to selectively define the open and closed positions of the passenger portion.

8. The vehicle air-handling system of claim 7, wherein the planar blocking member slidably operates within a slot defined within the operable duct.

9. The vehicle air-handling system of claim 2, wherein the heat exchanger and the blower define a common blowing assembly that serves each of the driver and passenger portions of the operable duct.

10. An air-handling system for a vehicle, the air-handling system comprising:

a heat exchanger disposed within a housing;

a blower in communication with the heat exchanger;

an operable duct positioned external to the housing and in communication with each of the heat exchanger and the blower; and a planar blocking member that is slidably operable within a slot that is defined within the operable duct; wherein the operable duct includes a driver portion that serves a driver section of a passenger cabin each time the blower is activated and a passenger portion that selectively serves a passenger section of the passenger cabin when the blower is activated;

the operable duct receives a driver-side air conduit and a passenger-side air conduit and defines an adapter that attaches the driver-side and passenger-side air conduits to the housing; and the planar blocking member of the operable duct operates within the passenger portion of the operable duct between an open position where the heat exchanger and the blower are in communication with the passenger section and a closed position wherein the heat exchanger and the blower are only in communication with the driver section, the open position defined by the planar blocking member being completely outside of the driver and passenger portions.

11. The air-handling system of claim 10, wherein the operable duct is an intermediate duct.

12. The air-handling system of claim 10, wherein the operable duct is a floor duct.

13. The air-handling system of claim 10, wherein the operable duct is a panel duct.

* * * * *